June 7, 1966 L. L. PARKS 3,254,697
FUEL SUPPLY SYSTEM
Filed March 18, 1964
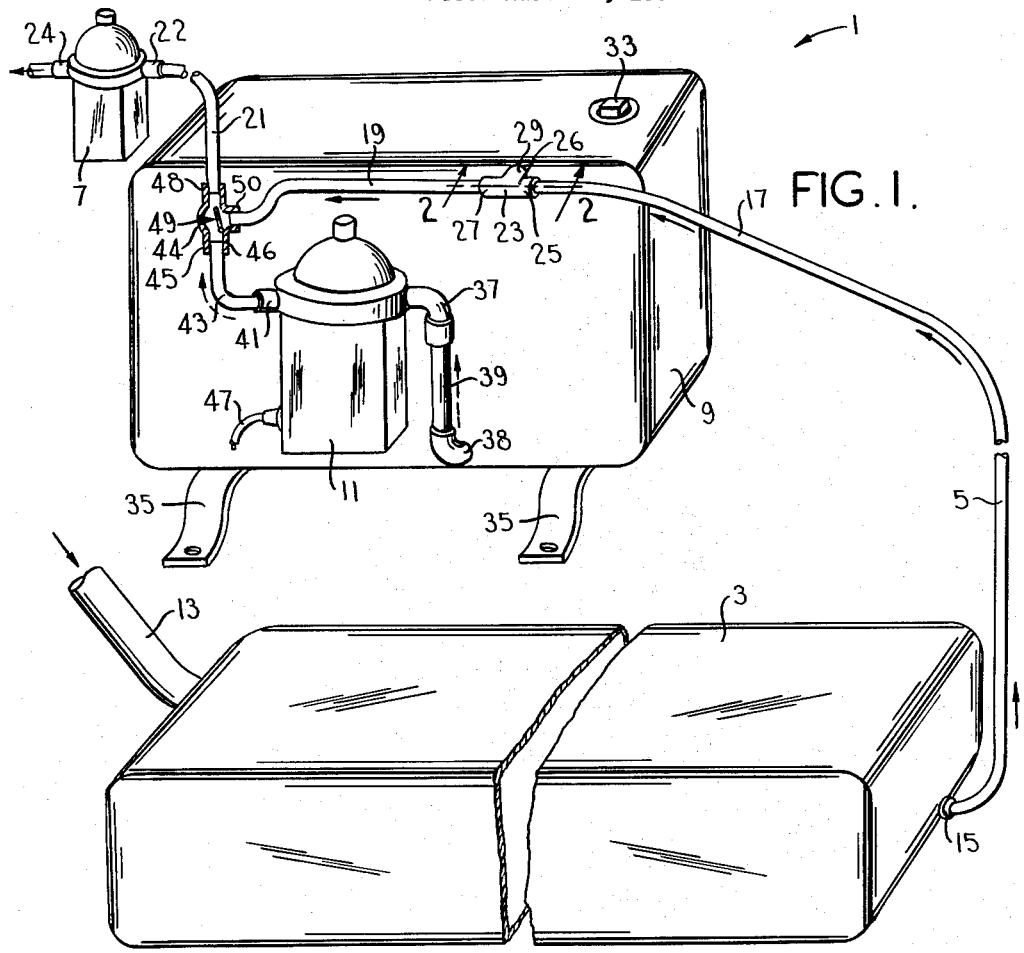
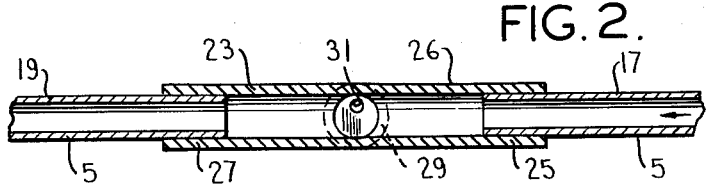
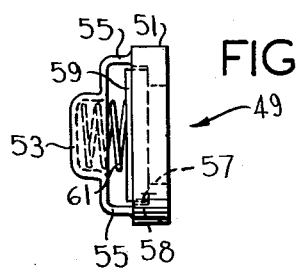
Lyman L. Parks,
Inventor
Koenig, Senniger, Powers and Leavitt,
Attorneys.

United States Patent Office 3,254,697
Patented June 7, 1966

3,254,697
FUEL SUPPLY SYSTEM
Lyman L. Parks, 401 W. Morgan, Sedalia, Mo.
Filed Mar. 18, 1964, Ser. No. 352,793
10 Claims. (Cl. 158—46.5)

This invention relates to a system for supplying fluids, such as a combustible fuel, and more specifically the invention relates to a fuel supply system for fuel consuming devices, such as engines of vehicles such as automobiles, trucks, etc.

Among the several objects of this invention may be noted the provision of a supply system for fluids, such as fuels, by means of which a reserve supply of fluid is automatically transferred to a tank or reservoir and held until the primary supply of the fluid is exhausted; the provision of a fuel supply system for vehicles such as automobiles and the like in which an emergency supply of fuel can be delivered on demand; the provision of an emergency fuel supply system for automobiles and other vehicles whereby fuel can be supplied to the engine of the vehicle even though the primary fuel pump for the engine is not properly functioning; the provision of a fuel supply system for vehicles or the like in which an auxiliary fuel tank is automatically filled during normal operation of the fuel supply system; the provision of an emergency fuel supply system for vehicles or the like whereby an auxiliary reservoir can be filled without an excessive amount of moisture and/or sediment being provided to the auxiliary reservoir; the provision of an emergency fuel supply system for engines or the like wherein an emergency or auxiliary fuel tank is filled in a manner which reduces the possibility of the system leaking during filling of the auxiliary tank; and the provision of a fuel supply system for automobile engines or the like which substantially reduces the possibility of being stranded in remote locations as a result of exhaustion of the fuel supply or failure of the fuel pump for the vehicle. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a view, partially in cross section and partially diagrammatically, illustrating a fuel supply system of this invention;

FIG. 2 is an enlarged partial cross section taken along the line 2—2 of FIG. 1; and FIG. 3 is an elevation view of a check valve which may be used in the system of this invention.

Corresponding reference characters indicate corresponding parts throughout the several views of the drawings.

Referring to the drawings, a fuel supply system of this invention is shown in its entirety at 1 in FIG. 1. The fuel supply system 1 includes a main or primary fuel tank 3 which is connected by a fuel line or conduit 5 to a primary fuel pump 7 which can supply fuel to the desired location, such as to a fuel consuming device, and more specifically to the carburetor of an internal combustion engine of an automobile, bus, truck, or the like. An auxiliary fuel tank 9 is provided and an auxiliary fuel pump 11 is connected to the fuel tank 9 and to the fuel line or conduit 5 so that fuel can be provided from tank 9 through pump 11, as well as from tank 3 through pump 7.

The tank 3 can be a common fuel tank for an automobile or other vehicle and includes a filler neck or spout 13 by which the tank can be filled and a fuel outlet or fitting 15 at a lower portion of the tank through which fuel can be supplied to the fuel line 5. Tank 3 is normally vented to the atmosphere to prevent creation of a vacuum within the tank by removal of fuel therefrom. The fuel line 5 can be a common copper or aluminum tubing or can be made of other metals, flexible materials, etc. and is illustrated as having three sections 17, 19 and 21. Pump 7 has an inlet 22 connected to section 21 and pump outlet 24 is connected to an engine, etc. (not shown).

The fuel line 5 is connected by a fitting or coupling 23 to tank 9. The coupling 23 is generally T-shaped and has a head 26 having ends or arms 25 and 27 connected to a leg or stem 29, the stem 29 being mounted in an inlet at the upper portion of the auxiliary tank 9 and the ends 25, 27 of the head 26 being connected in the fuel line between sections 17 and 19, respectively. The stem 29 and head 26 of the coupling 23 have bores therethrough and the bore in stem 29 has a restricted orifice or opening smaller than the bore in head 26 as shown in FIG. 2. The coupling 23 is mounted with stem 29 substantially horizontal and orifice 31 is located above the vertically lower portion of the bore through the head 26 of coupling 33 so that sediment, moisture and other impurities in the fuel which are normally in the lower portion of the fuel line will not pass into the tank 9. The orifice 31 in the stem 29 of the coupling 23 provides means for metering fuel into the tank 9 so that most of the fuel from section 17 of the fuel line 5 is passed through the bore in the head 26 of the coupling 23 and into section 19 of the fuel line. In practice, a bore diameter of ¼ to 5/16 of an inch in head 26 and an orifice 31 of about ⅛ inch diameter in stem 29 have been found satisfactory.

The tank 9 is normally filled by fluid passing through the fuel line 5 and through the orifice 31 in the stem 29 of the fitting 23 as explained hereinafter. Tank 9 is normally closed to the atmosphere but may be provided with a filler or inspection plug 33 at the upper portions thereof which can be used to periodically remove any sediment from the tank, to evacuate the tank, etc. The auxiliary tank 9 has brackets 35 connected thereto for mounting the tank in the desired location, such as in the trunk of the car or other vehicle, on the bottom of the body, etc.

The auxiliary fuel pump 11 has an inlet 37 connected to an outlet 38 of the auxiliary fuel tank 9 by means of a conduit 39. Pump 11 has an outlet 41 connected by a conduit 43 and a coupling 44 to the fuel line 5. Coupling 44 is T-shaped and has a head 45 with an end 46 connected to the conduit 43 and another end 48 of its head and its stem 50 are connected between the sections 21 and 19, respectively, of the fuel line 5.

The fuel pump 11 is an electrically operated fuel pump so that it can be located remote from the engine or mechanically driven apparatus and can be easily actuated. The pump 11 has a cable or the like 47 containing electrical conductors which are connected through a suitable switch (not shown) to the electrical system of the automobile, etc. The switch for operation of pump 11 is preferably mounted on the dash of the vehicle so that fuel can be pumped from tank 9 by closing the switch to place the fuel pump 11 in an electrical circuit and fuel or other fluids are then pumped from tank 9 by pump 11 through conduit 43 into fuel line section 21.

Valve means 49 are provided in the fuel line 5 as diagrammatically illustrated in FIG. 1 to prevent circulation of fuel by pump 11 from the tank 9 through conduit 43, coupling 44, fuel line section 19 and coupling 23 back to the tank 9. The valve 49 is preferably a check valve and is mounted in stem 50 of coupling 44 so that suction from pump 7 will open the valve 49 to permit fuel to pass through section 19 of fuel line 5. By locating the valve 49 as shown in FIG. 1, pressure of fluid from pump 11 closes the valve and prevents fuel or other fluids from pump 11 from entering fuel line section 19. Also, when pump 11 is operating a suction is created in conduit 39, tank 9 and fuel line section 19 which aids in closing the valve 49.

A check valve suitable for use in the fuel system of this invention is illustrated in FIG. 3 of the drawings and includes a body or housing 51 and a cap 53 spaced from the body 51 and connected thereto by legs 55 which are spaced from each other to permit passage of fuel or other fluids between the legs. The body 51 has a bore 57 therethrough and a flange or valve seat 58 against which a valve member 59 seats to close the valve. The valve member 59 is urged into closed position against the seat 58 by a helical spring 61 which engages the cap 53. Pressure of fuel against the valve member 59 from the right of the valve as shown in FIG. 3 or a suction or vacuum from the left of the valve as shown in FIG. 3 will move the valve member 59 against the force of the spring 61 to permit passage of the fuel or other fluids therethrough. The check valve 49 as shown in FIG. 3 is merely illustrative of one type of valve that can be used and it will be understood by those skilled in the art that various check valves, automatically operated valves or manually operated valves can be used.

In operation, and assuming that the main or primary fuel tank 3 and the auxiliary tank 9 are both empty, tank 3 is filled with fuel through the filler neck 13. Operation of fuel pump 7 creates a vacuum or suction in the fuel line 5 and draws fuel from the primary or main fuel tank 3 through the fuel line 5 in the direction indicated by the arrows, and through coupling 23 and coupling 44, and fuel pump 7 delivers the fuel to the engine or other fuel consuming device. Tank 9 is normally filled during operation of pump 7. Since the tank 9 is normally closed to the atmosphere, operation of pump 7 and creation of a partial vacuum or suction in the fuel line 5 reduces the pressure of the atmosphere in auxiliary tank 9, and fuel in the fuel line 5 is drawn into tank 9 through the orifice 31 in coupling 23. Orifice 31 in coupling 23 meters fuel into tank 9 so that tank 9 gradually fills without interfering with the supply of fuel to the engine through pump 7. When the tank 9 is filled, operation of pump 7 draws fuel entirely from tank 3 through fuel line 5.

The orifice 31 in the coupling 23 is located above the vertically lowest portion of the bore in head 25, 27 of the coupling 23 and this substantially prevents entrance of moisture and/or sediment into the tank 9. Removal of any significant quantity of fuel from tank 9 through coupling 23 is prevented by mounting of the coupling in the upper portion of the tank 9 and by the tank 9 being closed to the atmosphere so that any fuel removed through coupling 23 would create a partial vacuum in the tank 9 which would oppose any further removal of fuel. Also, the bore in head 26 of coupling 23 are larger than orifice 31 which reduces the possibility of fuel passing from tank 9 through coupling 23.

When all of the fuel has been removed from the main or primary fuel tank 3, the vehicle engine will begin to cough or sputter, and the operator will then close the switch on the dash board which operates fuel pump 11. Pump 11 draws fuel from the outlet 38 of the tank 9 through conduit 39 and pumps the fuel through the conduit 43 into the coupling 44 and then into section 21 of the fuel line 5 for transfer to the engine. The pressure of fuel passing through the coupling 44 from conduit 43 will close the valve 49, and closing of this valve is aided by spring 61 in the valve. At this time, the auxiliary tank 9 is vented to the atmosphere through fuel line section 17 and the primary or main fuel tank 3.

The fuel pump 11 can be used as an auxiliary fuel pump and placed in operation if the fuel pump 7 fails. Assuming fuel is present in tanks 3 and 9, fuel is pumped from tank 9 by the fuel pump 11 and delivered through the fuel line section 21 to the engine, and a partial vacuum created in tank 9 by removal of fuel therefrom draws fuel in tank 3 through the fuel line section 17 and the coupling 23 into tank 9.

By utilizing vacuum or suction from pump 7 to fill tank 9, as opposed to a pressure filling operation, leaks which might occur by a substantial pressure during filling operations are avoided, such being particularly desirable in view of the highly inflammable fuels used in operation of automobiles and other vehicles.

Tank 9 can be of any suitable size, depending upon the amount of reserve fuel required. For example, for normal operation with an automobile having a 15 to 25 gallon main or primary fuel tank 3, the tank 9 can be approximately 1 to 2 gallons in capacity. This is normally a sufficient fuel supply to permit the vehicle operator to reach a service station after the main or primary tank 3 has been drained of fuel.

While the system of this invention has been described in connection with a fuel supply system for a vehicle, it will be understood that the system is applicable to transfer of fuels or other fluids in various environments, including fixed power plant operations and fluid distribution systems.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fuel supply system for a fuel consuming device comprising a first fuel tank having a fuel outlet, a fuel line connected to said outlet, a first fuel pump having an inlet connected to said fuel line, a second fuel tank having an inlet and an outlet, a first coupling connecting the inlet of said second fuel tank in fluid communication with said fuel line between the first fuel tank and said fuel pump, a second fuel pump having a fuel inlet and a fuel outlet, the fuel inlet of said second fuel pump being operatively connected to said outlet of said second fuel tank, a second coupling connecting said outlet of said second fuel pump to said fuel line between said first coupling and said first fuel pump, and valve means in said fuel line between said couplings operable to prevent passage of fuel from said outlet of said second fuel pump to said inlet of said second fuel tank.

2. A fuel supply system as set forth in claim 1 wherein said valve means is a check valve which opens upon operation of said first fuel pump and closes upon operation of said second fuel pump.

3. A fuel supply system as set forth in claim 1 wherein said first coupling is a T-shaped coupling having its stem connected to said inlet of said second fuel tank and having its head connected in said fuel line, said stem having a restricted orifice therein constituting metering means for fuel passing into said second fuel tank.

4. A fuel supply system as set forth in claim 3 wherein said second coupling is a T-shaped coupling having a stem and a head with said stem and one end of said head being connected in said fuel line and with the other end of said head being connected to said outlet of said second fuel pump, said valve means being a check valve and being mounted in said stem of said second coupling.

5. In a fuel supply system for engine of vehicles or the like having a primary fuel pump with an inlet and outlet with the outlet adapted to be connected to the engine, a primary fuel tank having an outlet, and a fuel line connected between the tank outlet and the pump inlet, the improvement comprising the provision of an auxiliary fuel tank having an inlet and an outlet, a first coupling adapted to connect the inlet of said auxiliary fuel tank to said fuel line between the primary fuel pump and said primary fuel tank, an auxiliary fuel pump having an inlet and an outlet with the inlet being connected to said outlet of said auxiliary fuel tank, a second coupling adapted to connect said outlet of said auxiliary fuel pump to said fuel line between said first coupling and said primary fuel pump, and valve means in said second coupling to prevent passage of fuel from said outlet of said auxiliary fuel pump and said first coupling.

6. A fuel supply system as set forth in claim 5 having metering means with said first coupling operable to regulate passage of fuel into said auxiliary fuel tank.

7. A fuel supply system as set forth in claim 5 wherein said valve means is a check valve which opens upon operation of said primary fuel pump and closes upon operation of said auxiliary fuel pump.

8. A fuel supply system as set forth in claim 5 wherein said first coupling is a T-shaped coupling having its stem connected to said inlet of said auxiliary fuel tank and having its head connected in said fuel line, said stem having a restricted orifice therein constituting metering means for fuel passing into said auxiliary fuel tank.

9. A fuel supply system as set forth in claim 8 wherein said second coupling is a T-shaped coupling having a stem and a head with said stem and one end of said head being connected in said fuel line and with the other end of said head being connected to said outlet of said auxiliary fuel pump, said valve means being a check valve and being mounted in said stem of said second coupling.

10. In a fuel supply system for engines of vehicles or the like having a primary fuel pump with an inlet and outlet with the outlet adapted to be connected to the engine, a primary fuel tank having an outlet, and a fuel line connected between the tank outlet and the pump inlet, the improvement comprising the provision of an auxiliary fuel tank having an inlet and an outlet, a first T-shaped coupling having a stem and a head, said stem of said coupling being disposed in a generally horizontal plane and being connected to the inlet of said auxiliary fuel tank, said head of said coupling adapted to be connected to said fuel line between the primary fuel pump and said primary fuel tank, an auxiliary fuel pump having an inlet and an outlet with the inlet being connected to said outlet of said auxiliary fuel tank, a second T-shaped coupling having a stem and a head, one end of said head of said second coupling being connected to said outlet of said auxiliary fuel pump and the other end of said head and said stem of said second coupling adapted to be connected to said fuel line between said first coupling and said primary fuel pump, and a check valve mounted in said leg of said second coupling to prevent passage of fuel from said arms of said second coupling to said first coupling.

References Cited by the Examiner

UNITED STATES PATENTS

| 1,545,996 | 7/1925 | Aspren et al. | 158—46.5 |
| 1,570,010 | 1/1926 | Scowcroft | 158—46.5 |
| 2,818,915 | 1/1958 | Pfeifer | 158—46.5 |

FREDERICK KETTERER, *Primary Examiner.*